US012272383B1

(12) United States Patent
Tripathi et al.

(10) Patent No.: US 12,272,383 B1
(45) Date of Patent: Apr. 8, 2025

(54) PERFORMANCE CHARACTERISTIC TRANSFER FOR LOCALIZED CONTENT

(71) Applicant: Amazon Technologies, Inc., Seattle, WA (US)

(72) Inventors: Rohun Tripathi, Seattle, WA (US); Angshuman Saha, Cupertino, CA (US); Naveen Sudhakaran Nair, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/412,549

(22) Filed: Jan. 14, 2024

Related U.S. Application Data

(63) Continuation of application No. 17/748,990, filed on May 19, 2022, now Pat. No. 11,875,822.

(51) Int. Cl.
| | | |
|---|---|---|
| *G11B 27/031* | (2006.01) | |
| *G06F 40/58* | (2020.01) | |
| *G06V 10/774* | (2022.01) | |
| *G06V 10/82* | (2022.01) | |
| *G06V 20/40* | (2022.01) | |
| *G10L 17/02* | (2013.01) | |
| *G10L 17/04* | (2013.01) | |
| *G10L 17/06* | (2013.01) | |
| *G10L 17/18* | (2013.01) | |
| *G10L 21/013* | (2013.01) | |
| *G10L 25/57* | (2013.01) | |

(52) U.S. Cl.
CPC ............ *G11B 27/031* (2013.01); *G06F 40/58* (2020.01); *G06V 10/774* (2022.01); *G06V 10/82* (2022.01); *G06V 20/41* (2022.01); *G10L 17/02* (2013.01); *G10L 17/04* (2013.01); *G10L 17/06* (2013.01); *G10L 17/18* (2013.01); *G10L 21/013* (2013.01); *G10L 25/57* (2013.01); *G10L 2021/0135* (2013.01)

(58) Field of Classification Search
CPC ....... G11B 27/031; G06F 40/58; G06V 10/82; G06V 20/41; G06V 10/774; G10L 17/02; G10L 17/04; G10L 17/06; G10L 17/18; G10L 21/013; G10L 25/57
See application file for complete search history.

(56) References Cited

U.S. PATENT DOCUMENTS

| | | | |
|---|---|---|---|
| 9,318,114 B2 | 4/2016 | Zeljkovic et al. | |
| 11,551,013 B1 * | 1/2023 | Gupta | .............. G06F 40/40 |
| 12,056,458 B2 * | 8/2024 | Meng | .............. G06F 40/51 |

(Continued)

*Primary Examiner* — Mishawn N. Hunter
(74) *Attorney, Agent, or Firm* — Nicholson De Vos Webster & Elliott LLP

(57) ABSTRACT

Systems and techniques for validation and generation of localized content for audio and video are described herein. The systems and techniques provide for training of twin neural networks to evaluate performance characteristics, sometimes referred to as content-auxiliary characteristics, of a localized performance. The localized performance may be validated or improved by identifying misalignment in the performance characteristics to ensure that localized content preserves content as well as creative intent and performance ability in the final product. The machine learning models trained using the techniques described herein may be used in connection with auto-localization processes to automatically generate high quality localized audio and video content.

20 Claims, 7 Drawing Sheets

(56) References Cited

U.S. PATENT DOCUMENTS

| | | |
|---|---|---|
| 2016/0295132 A1 | 10/2016 | Burgess |
| 2019/0332680 A1 | 10/2019 | Wang et al. |
| 2020/0184020 A1* | 6/2020 | Hashimoto ............. G06F 40/58 |
| 2021/0020161 A1 | 1/2021 | Gao |
| 2022/0310058 A1 | 9/2022 | Zhao et al. |
| 2023/0267285 A1* | 8/2023 | Wu ....................... G06F 40/166 |
| | | 704/2 |

* cited by examiner

PERFORMANCE CHARACTERISTIC TRANSFER FOR LOCALIZED CONTENT

RELATED APPLICATIONS

This application claims priority to and is a continuation of U.S. patent application Ser. No. 17/748,990, filed May 19, 2022, titled "PERFORMANCE CHARACTERISTIC TRANSFER FOR LOCALIZED CONTENT," the entirety of which is incorporated herein by reference.

BACKGROUND

Media content localization involves the process of adapting media content to particular users consuming the media content. Media content localization is an important process to increase the customer engagement and satisfaction in technologies such as streaming video. For example, having video content with localized voices, rather than only having localized text subtitles, significantly impacts the global reach of streaming service providers. Current media content localization (dubbing) processes involve significant manual steps including translation, voice over, mixing, and mastering, etc. Highly skilled workforce is required for each of these steps. Media content localization involves technologies such as video content analysis, language translation, and video dubbing (also referred to as voice-overs). Content studios spend significant amounts of time, money, and computational resources every year to generate localized voices for video media content. Dubbing is an especially challenging step in the media content localization process for the movie industry, since the process of dialogue translation relies on experts in the targeted localization language, such as, for example, Portuguese, French, Afrikaans, Japanese, and so forth. In manual dubbing, hired voice artists are expected to do much more than read a script. They are expected to maintain the same creative intent in the dubbed content as observed in the original content. The emotions, tone, cadence and quality of the performance have to be same as in the original, and the quality of performance may include emotion and other performance characteristics. Capturing the original voice characteristics in the dubbed content is important to preserve the original creative intent and ultimately providing the best customer experience.

BRIEF DESCRIPTION OF THE DRAWINGS

The detailed description is described with reference to the accompanying drawings. In the figures, the left-most digit(s) of a reference number identifies the figure in which the reference number first appears. The use of the same reference numbers in different figures indicates similar or identical components or features.

DETAILED DESCRIPTION

Figure 1:
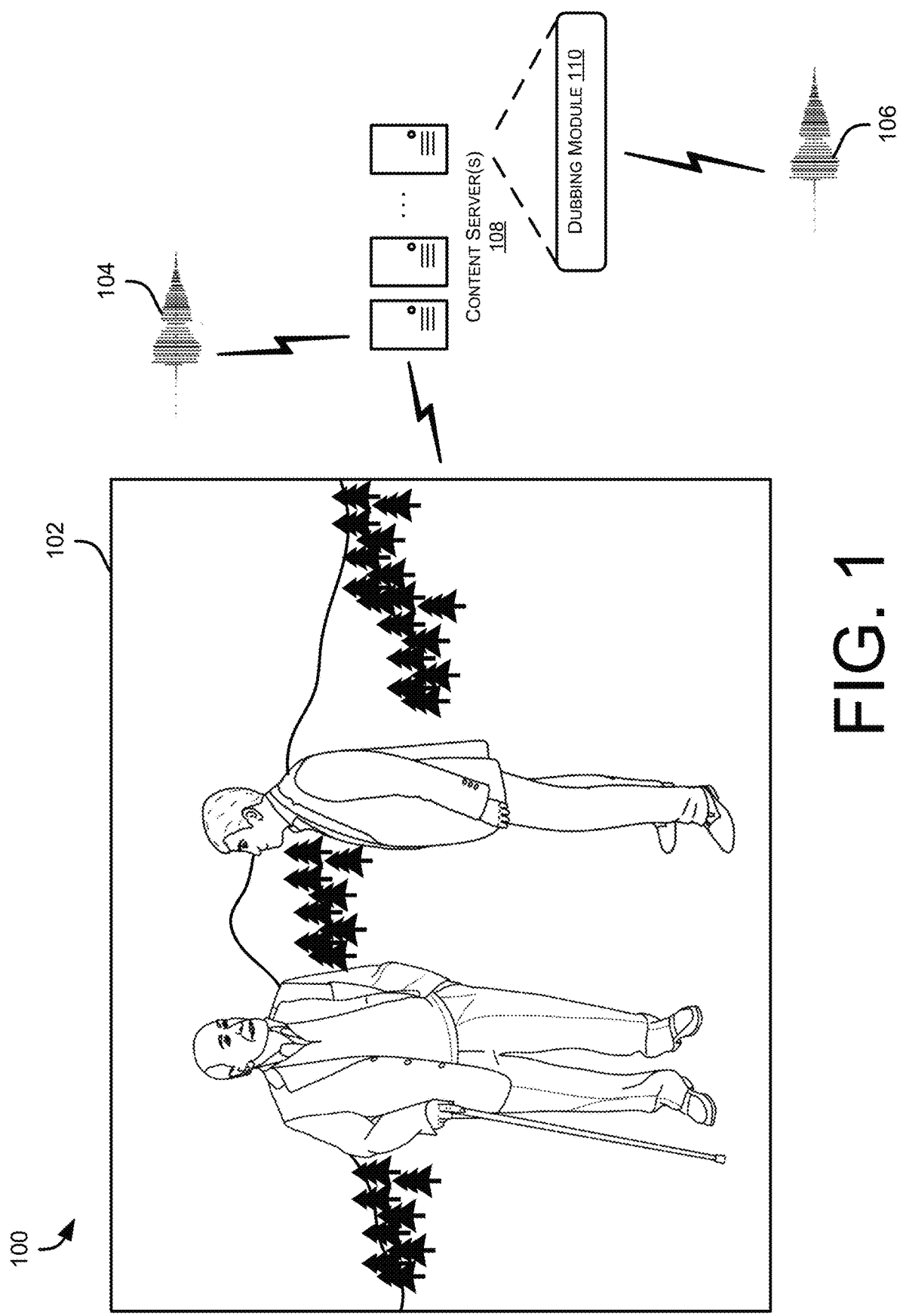
FIG. 1 illustrates an example of a system for content localization of audio and video data, according to the present description.

Described herein are, among other things, techniques, devices, and systems, for auto-dubbing and validation of dubbed content produced by manual or automated processes. Auto-dubbing aims at significantly reducing the amount of time, money, and computational resources spent on manual translation and dubbing through artificial intelligence, while delivering content that is at or better quality than manual dubbing. Whether generating synthetic voices or using voice over, the generated voice should maintain the same creative intent as in the original content. However, manually validating if the dubbed voices and performances maintain the original characteristics when creating dubs for many target languages is not feasible due to the large amount of time and resources required for manual validation of audio and/or video content. Additionally, because audio and video content is produced at ever-increasing rates, rates of content localization may not be able to keep pace with consumer demand without automating validation and/or generation of localized content. In this manner, the systems and techniques provided herein not only enable faster localization than conventional techniques, but also maintain high quality standards for the localized content. The systems and methods described herein provide a scalable solution to generation and validation of auto-dubbed content.

Further, to deliver the best possible localization experience to customers, the systems and method herein may include generation and validation of dubbed actor's lip movements in the video to match with the dubbed audio. In such dubbed video content, the generated lip movements reenact the same emotions and performances as in the original video performance. The systems and methods described herein may be used as quality checks for generated dubbed content and may ultimately lead to better generated contents in an automated content generation workflow for localization.

In generating dubbed content, the voice and appearance identity need to be transferred in addition to performance characteristics (content-auxiliary characteristics such as emotion and tone). For example, expression of anger in the localized content is scene specific as compared to the actor's general characteristics, thus needing a separate performance characteristic transfer along with identity transfer. Conventional directions of deriving loss functions from emotion classification and using in generative models suffer from limitations such as strong assumptions that emotions are discrete and finite and expensive human annotated data requirements for training the classifiers. The systems and methods described herein provide for capturing identity and performance characteristics in the localized content.

In particular, during other localization processes, machine learning models to perform localization need training data to be adequately trained to perform and output quality localized content. Labeling data with content-auxiliary characteristics, such as emotion, tone, pitch, etc., is time intensive and a difficult task for human labeling. Labeling such training data is not only expensive with respect to hours to manually label but is also difficult to label consistently as different human labelers may identify different content-auxiliary characteristics. The techniques described herein enable generation of training data for a machine learning model that bypasses the labeling required by other techniques by using a contrastive learning approach. In using the contrastive learning approach, the training data may use previously generated localized content as positive examples and may generate negative examples using the same previously generated content, or generate new negative examples from scratch as described herein. In this manner, a large volume of training data is already readily available for training the machine learning models used for localization as described herein.

The techniques described herein provide for automatic validation of quality for content-auxiliary characteristics for audio and video content localization (dubbing). The automatic validation produces a score or collection of scores indicative of how accurate the various content-auxiliary characteristics of the dubbed content are to the original content. The automatic validation process uses an artificial intelligence or machine-learned system that leverages existing dubbed content produced by professional studios and other such sources. Such professional content localization, while time-consuming, may be highly accurate to the original creative intent of the original content. As such, the professional content localization may be used as ground truth, as a positive instance, for training the machine-learned models used for validation.

In a particular example, the machine-learned models include a twin neural network trained using triplet loss over embeddings of positive and negative examples in the training data sets. Positive examples identify pairs of audio and/or video data that share similar performance characteristics, e.g., localized content that maintains emotion or other performance characteristics in addition to content. Negative examples identify pairs of audio and/or video data that do not share performance characteristics, or where the performance in a first sample differs at least with respect to the emotion or other performance characteristics from a second sample. In contrastive learning, the twin neural network learns higher-level features about the training data by receiving the positive (similar) and negative (dissimilar) sample data. By identifying positive and negative examples for training, contrastive learning enables training of the twin neural network through self-supervised learning. Using the positive and negative examples in a contrastive learning style enables the twin neural network to detect pairs of audio or video content close to each other with respect to content-auxiliary characteristics. The positive and negative examples are also used to separate video and audio segments with different content-auxiliary characteristics, even though the content may be transferred with fidelity during the localization.

In an example, original and content localized pairs for the same content are samples as positive instances. For negative instances, audio and/or video samples may be altered to intentionally mis-align the audio and/or video and afterwards may, in some examples, be annotate as negative instances. In some examples, the negative instances may be identified solely based on the source, such as coming from a system for misaligning or altering characteristics. In this manner, the positive and negative examples need not be annotated at all for training the model. The mis-aligned negative instances may be used to train the twin neural network to detect when the dubbing fails to preserve the creative intent as well as to identify when the content is out of alignment. Additional negative examples may be generated to ensure that the validation is focused on content-auxiliary characteristics and not just content translation. In such cases, negative examples may be generated by manually altering performance characteristics of a source audio file such that the content-auxiliary characteristics are not preserved. In such examples, the motion, sentiment, pitch, punctuation, and other such characteristics may be varied to generate negative examples for training the twin neural network. In some examples, a text-to-speech program may be used to create performances of transcribed audio from an original file where the text-to-speech program may be used to alter the content-auxiliary characteristics. The positive and negative instances may be used for contrastive training of the twin neural network to produce a dubbing score for content localized data from a source file.

The techniques described herein also provide for using content-auxiliary characteristic information in generative models for content localization. As compared with audio data, video does not include parallel streams for generating positive and negative instances for training of a neural network as described above. In such examples, training data may be generated by classifying emotion or sentiment in video data using a classifier, such as a machine learning model configured to identify sentiment or emotion. The video clips and associated sentiment data may be paired with other video clips having similar or identical sentiment classifiers for positive instances and may be paired with video clips having different characteristics for negative examples. In some examples, an audio data file associated with each video data file may be used to identify video clips having similar characteristics. Pairs of video clips associated with audio clips having the same or similar characteristics can be used as positive examples and pairs of video clips associated with audio clips having diverging or different characteristics can be used as negative training examples. Once the positive and negative training pairs are identified, a three-dimensional (3D) convolution twin neural network can be trained with the video pairs in the same fashion as the twin neural network described above.

The neural networks described above may be used in content generation networks or systems. The content generation networks are trained to preserve a speaker identity, content, and performance characteristics. The generative models can use the twin neural network described herein as a loss to generate audio and/or video clips that are content localized to preserve the identity, content, and performance characteristics.

The systems and methods described herein provide numerous benefits over typical content localization systems and techniques. The localized content produced using the systems and techniques described herein improve consumer experiences by preserving content, identity, and performance characteristics in the final product. Additionally, the techniques herein provide for improved auto-dubbing that enables more rapid production of localized content over conventional techniques.

Having now discussed examples of the systems and methods described herein, FIG. 1 illustrates an example of a system 100 for content localization of audio and video data, according to the present description. In the example of FIG. 1, the system 100 includes content server(s) 108 that host the video data 102 and audio data 104. The video data 102 and audio data 104 may include data from movies, videos, songs, dialogue, television programs, music, podcasts, and other sources of video and/or audio data that may be consumed by users in one or more languages. The video data 102 and audio data 104 are in a first language. The content server(s) 108 also include a dubbing module 110 that can be used to localize the audio data 104 and the video data 102 to produce audio data 106 and/or second video data in a second language. The dubbing module 110 is configured to validate content localization and/or as a feedback system for an auto-generation system of content localization. The dubbing module 110 is configured to ensure that content as well as performance characteristics of the original performance is carried through to the localized content. The performance characteristics may include information such as the tone, pace, emotion, pitch, inflection, or other such characteristics that are auxiliary to the textual content of the performance and are referred to sometimes herein as content auxiliary characteristics.

The dubbing module 110 validates and/or scores localized content for audio or video performances as compared with the original performance. In this manner, the dubbing module 110 may be used to ensure that performance characteristics are carried through the localized content. The automatic validation by the dubbing module 110 outputs a score or collection of scores indicative of how accurate the various content-auxiliary characteristics of the dubbed content are to the original content. The dubbing module 110 may include one or more machine learning models that leverage existing localized content produced by professional studios and other such sources. Such professional content localization, while time-consuming, is often highly accurate to the original creative intent of the original content. As such, the professional content localization may be used as a positive instance for training the machine-learned models of the dubbing module 110 used for validation and score generation.

The dubbing module 110 includes a twin neural network trained using triplet loss over embeddings of positive and negative examples in the training data sets. Triplet loss has been employed in facial recognition algorithms, such as FaceNet, and uses a given input to select a positive sample and a negative sample, the positive sample being from the same class as the input and the negative sample being from a different sample. Triplet loss then learns to minimize the distance between the input and the positive example and maximize the distance between the input and the negative example at the same time. Therefore, the positive and negative examples are pairs of audio and/or video data that are either similar (positive) or dissimilar (negative) with respect to preservation of performance characteristics between the pairs of audio and/or video. For example, a professionally curated and produced localized audio file will share the performance attributes of the original audio file as a result of the time, care, and skill of the professional localization process. Such professionally curated localized content will match or very closely align performance characteristics (e.g., emotion, tone, pacing, pitch, etc.) of the original content. The original content and the professionally localized content therefore serve as a pair reflecting a positive instance. In a negative example, misalignments of the performance characteristics (e.g., a performance that is angry and sad in the original content, but the localized content is instead happy and relaxed) are reflected in the performance, though the underlying content (e.g., text) remains consistent. Such misaligned pairs serve as negative examples to illustrate to the model when the performance characteristics are not preserved from the original content to the localized content.

The twin neural network is an artificial neural network that uses the same weights while working in tandem on two different input vectors to compute comparable output vectors. The twin neural networks include two or more identical subnetworks, identical meaning that they share the same configuration with the same parameters and weights. Therefore, parameter updating is mirrored across both sub-networks, at the convolution layers 312, 314, 410, and 414 of FIGS. 3 and 4. The identical subnetworks can be used to find the similarity of the inputs by comparing the feature vectors of the parallel identical subnetworks. In some examples, one of the output vectors is precomputed, thus forming a baseline against which the other output vector is compared. In this manner, the dubbing module 110 may compare performance characteristics of localized content against performance characteristics of an original source data. For example, the audio data 104 may be the original audio file while the audio data 106 is localized. The dubbing module 110 may use the twin neural network to validate the performance characteristics of the audio data 106 and score preservation of the performance characteristics from the audio data 104 into the audio data 106. In another example, the video data 102 may be compared against localized content by the dubbing module 110 to evaluate the emotional or other performance characteristics of the altered video of the localized content. The positive and negative examples can be used to train the twin neural network in a contrastive learning style enables the twin neural network to detect pairs of audio or video content close to each other with respect to content-auxiliary characteristics. The positive and negative examples are also used to separate video and audio segments with different content-auxiliary characteristics, even though the content may be transferred with fidelity during the localization.

During training of the twin neural network of the dubbing module 110, original and content localized pairs for the same content are samples as positive instances (e.g., a pair that share the same or nearly identical performance characteristics) and identified as such. For negative instances (e.g., original and localized pairs that do not share performance characteristics but may share underlying content), audio and/or video samples may be altered to intentionally misalign the audio and/or video and afterwards may annotate as negative instances. The mis-aligned instances may be used as negative instances to train the twin neural network to detect when the dubbing fails to preserve the creative intent as well as to identify when the content is out of alignment. Additional negative examples may be generated to ensure that the validation is focused on content-auxiliary characteristics and not just content translation. In such cases, negative examples may be generated by manually altering performance characteristics of a source audio file such that the content-auxiliary characteristics are not preserved. In such examples, the motion, sentiment, pitch, punctuation, and other such characteristics may be varied to generate negative examples for training the twin neural network. In some examples, a text-to-speech program may be used to create performances of transcribed audio from an original file where the text-to-speech program may be used to alter the content-auxiliary characteristics. The positive and negative instances may be used for contrastive training of the twin neural network to produce a dubbing score for content localized data from a source file. The positive and negative instances are used for training because it is an efficient and effective manner to train the twin neural network to identify the distance or difference between the inputs to the twin neural network. Contrastive learning is particularly useful for training using unlabeled data, and only requires inputs of positive and negative example pairs for training of the model. Therefore, the training and generation of training data for the twin neural network is much faster and more efficient than with other training techniques.

The dubbing module 110 may also be used for generating localized content from original data. In such examples, video data 102 and/or audio data 104 may be input into a localized content generation network that may use the twin neural network of the dubbing module 110 to evaluate the localized content as-generated, and can be used for feedback and further development of the localized content to produce higher quality localized content using an auto-dubbing technique and/or system. The use of the twin neural network to generate localized content while preserving content-auxiliary characteristics improves localization quality and produces a more improved product over conventional localization approaches. The techniques described herein improve consistency and maintenance of the content-auxiliary characteristics.

Video data 102 does not include parallel streams for generating positive and negative instances for training of a neural network as described above. In such examples, training data may be generated by classifying emotion or sentiment in video data 102 using a classifier, such as a machine learning model configured to identify sentiment or emotion. One such example of a classifier may be Amazon Rekognition®, owned by Amazon Technologies, Inc., a cloud-based software service for computer vision. The video clips and associated sentiment data may be paired with other video clips having similar or identical sentiment classifiers for positive instances and may be paired with video clips having different characteristics for negative examples. In some examples, an audio data file associated with each video data file may be used to identify video clips having similar characteristics. Pairs of video clips associated with audio clips having the same or similar characteristics can be used as positive examples and pairs of video clips associated with audio clips having diverging or different characteristics can be used as negative training examples. Once the positive and negative training pairs are identified, a 3D convolution twin neural network can be trained with the video pairs in the same fashion as the twin neural network described above.

The content server(s) 108 and/or the dubbing module 110 may be used for validation of performances in real-time, such as during a localization process performed manually (e.g., one or more actors performing localized text) or during an auto-generated process (e.g., output of localized content from one or more machine learning algorithms). In such examples, the dubbing module 110 may indicate a score indicative of the level of matching or closeness of the performance characteristics of the localized content with the performance characteristics of the original performance. In some examples, the score may also include clusters or indications of one or more emotions or other performance characteristics that align or do not align between the performances. In this manner, the dubbing module 110 may be used to guide adjustment of the performance for the localized content in order to preserve the creative intent in the localized content.

In an illustrative example, a movie is produced in English and includes video data 102 as well as audio data 104, with the video data 102 showing the actors performing and speaking the English language of the audio data 104. For purposes of expanding customer reach and providing greater access to the movie across different languages, a studio, distributor, or other stakeholder may wish to have the movie localized (dubbed) into one or more additional languages. Translating a script may be a relatively straightforward task, as it can be partially or fully automated, however ensuring that the dubbed performance maintains the original creative intent and performance by the actors is much more difficult. The process of having a professional studio localize the movie by creating localized audio in a second language other than English, and synthetically altering the video data 102 to reflect the actors speaking the localized audio rather than the English audio data 104, is time intensive and expensive. In an automated localization technique, the face, lips, or other portions of the video data 102 may be extracted and altered or replaced with performance in the localized language. The dubbing module 110 is used to evaluate the audio data 106 (the localized audio data) and the localized video data to identify misalignments of the performance characteristics (e.g., the emotion, urgency, pitch, tone, and other performance delivery attributes) between the original and localized data. In this manner, a localization workflow, whether automated or manual, can validate that the localized audio and video of the final product preserves not only the content (e.g., the script), but also preserves attributes of the performance in the localized version of the movie. As a result, the localized movies produced using the dubbing module 110 may be produced in a more rapid manner (with either manual or automated localization) due to the real-time or near-real-time ability of the dubbing module to provide feedback on the performance characteristics of the localized content. The localized movie is also produced with higher quality, due to the preservation of the performance characteristics, than many conventionally localized movies, thereby providing a positive experience for consumers in the second distribution region.

Figure 2:
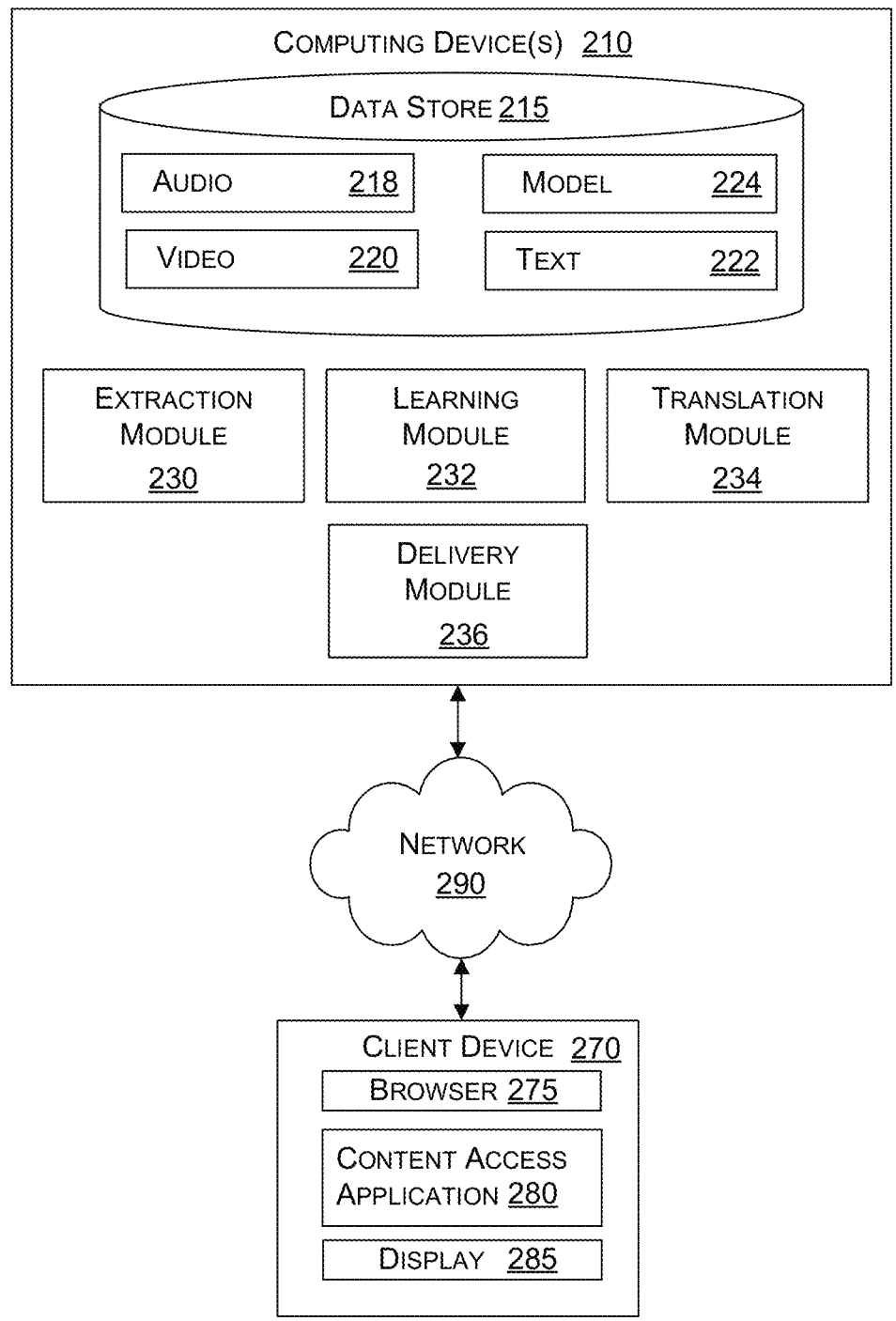
FIG. 2 is a block diagram of a computing system for validating and generating dubbed content for audio and video, according to the present description.

FIG. 2 is a block diagram of a computing system for validating and generating dubbed content for audio and video, according to the present description.

In one example, the system may include one or more server computers or other computing devices such as computing device 210. The computing device 210 may be an example of the content server(s) 108 of FIG. 1. The computing device 210 may be a computing device of a movie studio or other content generator that wishes to produce video and/or audio data in multiple languages from a single original performance. Software on the computing device 210 may be an application or a computer program, such as may be designed to perform an activity, such as analyzing data, comparing data, learning models from data and so forth. Applications executable on the computing device 210 and in the service provider environment may be any suitable type or form or application as may be appreciated.

The system may include one or more data stores 215. The data store 215 may include or be configured to store any of a variety of useful types and formats of data. For example, the data store 215 may include an audio data store 218 for storing audio and a video data store 220. The audio data store 218 may store original audio data files in a first language and the video data store 220 may store original video files associated with audio files in a first language. The audio data store 218 and video data store 220 may also store localized versions of the original audio and video data, for example after processing or being generated. The data store 215 may include a text data store 222 for storing text transcriptions of the audio data that may be used in generation of localized content, for example by a text-to-speech program. The text may include, for example, lyrics, transcripts, scripts, or any other text extracted from or associated with the audio data. The data store 215 may also include a model data store 424 for storing training data for use in creating machine learning models for identifying voices or for synchronizing text with audio in examples where machine learning is used. The model data store 224 may further store the machine learning models created. The training data stored in the model data store may include training data sets, such as the positive and negative examples described herein that may be used to train the twin neural network. In some examples the model data store 224 may also include data for training other machine learning algorithms, such as emotion classifiers or other such models and algorithms described herein.

The system may include any number of modules useful for enabling the validation and generation of localized content from the computing device 210. For example, the system may include an extraction module 230 to extract emotion or performance characteristic features from video data using an emotion classifier or other such machine learning algorithm.

The system may include a translation module 234. The translation module 234 may be configured to translate the text data from the text data store 222 from a first language to a second language, to ensure content accuracy between the original and localized performances. The translation module may implement one or more translation techniques including machine learning techniques or other translation techniques for translating content from one language to another and conveying intent and accuracy, determine a number of the segments of the text to synchronize with the voice segment. The system may include a learning module 232 to learn the machine learned models used to validate the audio and video localized performances, as well as other machine learning algorithms, such as the translation module 234 and/or the emotion classifier.

Machine learning may take empirical data as input, such as data from the manually classified audio, and yield patterns or predictions which may be representative of content-auxiliary characteristics associated with the audio and video data. Machine learning systems may take advantage of data to capture characteristics of interest having an unknown underlying probability distribution. Machine learning may be used to identify possible relations between observed variables. Machine learning may also be used to recognize complex patterns and make machine decisions based on input data. In some examples, machine learning systems may generalize from the available data to produce a useful output, such as when the amount of available data is too large to be used efficiently or practically. As applied to the present technology, machine learning may be used to learn which performance characteristics are preserved during a localization process and validate localized content when the performance characteristics are preserved.

Machine learning may be performed using a wide variety of methods of combinations of methods, such as contrastive learning, supervised learning, unsupervised learning, temporal difference learning, reinforcement learning and so forth. Some non-limiting examples of supervised learning which may be used with the present technology include AODE (averaged one-dependence estimators), artificial neural network, back propagation, Bayesian statistics, naive bayes classifier, Bayesian network, Bayesian knowledge base, case-based reasoning, decision trees, inductive logic programming. Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, subsymbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Another example of machine learning includes data pre-processing. Specific details regarding any of the examples of supervised, unsupervised, temporal difference or other machine learning described in this paragraph that are generally known are also considered to be within the scope of this disclosure. Support vector machines (SVMs) and regression are a couple of specific examples of machine learning that may be used in the present technology.

The system may also include a delivery module 236 configured to deliver audio from the audio data store 218 to consumers at client devices (e.g., client device 270) over a network 290. The delivery module 236 may be configured to deliver the audio or video in either the original or localized formats to the client device 270 for display and consumption. The delivery module 236 may deliver the audio and synchronized text in a streaming mode or for download.

Client devices 270 may access audio data and video data via the computing device 210 in the service provider environment over a network 290. Client device 270 may include input/output devices 285 such as a display, speakers, or other such outputs to present the audio and/or video data to a consumer. The client device 270 may include any devices used by consumers to consume the video and/or audio data in either an original language or a localized language. For example, returning to the movie example of FIG. 1, a first consumer may wish to view a movie in English, while a second user wishes to view in a second language, such as French. In such examples, the client device may provide options for selecting the language preference, and may cause the client device 270, via the browser 275 and/or the content access application 280 to access the original (English) or localized (French) version of the movie based on the selection.

The system may be implemented across one or more computing devices in the service provider environment and including client devices 270 connected via a network 290. For example, a computing device 210 may include a data store and various engines and/or modules such as those described above, and such modules may be executable by a processor of the computing device. The system may be implemented as a plurality of computing nodes or computing instances, each of which comprises at least one processor and a memory, where the computing nodes are configured to collectively implement the modules, data stores and so forth.

The modules that have been described may be stored on, accessed by, accessed through, or executed by a computing device 210. The computing device 210 may comprise, for example, a server computer or any other system providing computing capability. Alternatively, a plurality of computing devices may be employed that are arranged, for example, in one or more server banks, blade servers or other arrangements. For example, a plurality of computing devices together may comprise a clustered computing resource, a grid computing resource, and/or any other distributed computing arrangement. Such computing devices may be located in a single installation or may be distributed among many different geographical locations. For purposes of convenience, the computing device 210 is referred to herein in the singular form. Even though the computing device 210 is referred to in the singular form, however, it is understood that a plurality of computing devices may be employed in the various arrangements described above.

Various applications and/or other functionality may be executed in the computing device 210 according to various implementations, which applications and/or functionality may be represented at least in part by the modules that have been described. Also, various data may be stored in a data store that is accessible to the computing device 210. The data store 215 may be representative of a plurality of data stores as may be appreciated. The data stored in the data store 215, for example, may be associated with the operation of the various modules, applications and/or functional entities described. The components executed on the computing device 210 may include the modules described, as well as various other applications, services, processes, systems, engines or functionality not discussed in detail herein.

The client device 270 shown in FIG. 2 may be representative of a plurality of client devices that may be coupled to the network 290. The client device 270 may communicate with the computing device over any appropriate network, including an intranet, the Internet, a cellular network, a local area network (LAN), a wide area network (WAN), a wireless data network or a similar network or combination of networks.

The client device 270 may be configured to execute various applications such as a browser 275, a respective page or content access application 280 for an electronic retail store and/or other applications. The browser 275 may be executed in a client device 270, for example, to access and render content pages, such as web pages or other network content served up by the computing device 210 and/or other servers. The content access application 280 may be executed to obtain and render for display and output of content from the server or computing device, or other services and/or local storage media.

In some examples, the client device 270 may have one or more modules, such as part of the content access application 280, capable of performing audio and/or video localization on-board the client device 270. In some examples, the learning module 232 and/or other modules described herein may be implemented in real-time to localize content in real-time and provide it to the client device 270 as the localization is performed. Such localization may be performed in examples where bandwidth exists to perform the localization in real-time.

In some implementations, the content access application 280 may correspond to code that is executed in the browser 275 or plug-ins to the browser 275. In other implementations, the content access application 280 may correspond to a standalone application, such as a mobile application. The client device may be configured to execute applications beyond those mentioned above, such as, for example, mobile applications, email applications, instant message applications and/or other applications. Customers at client devices 270 may access content features through content display devices or through content access applications 280 executed in the client devices 270.

Although a specific structure may be described herein that defines server-side roles (e.g., of content delivery service) and client-side roles (e.g., of the content access application), it is understood that various functions may be performed at the server side or the client side.

Certain processing modules may be discussed in connection with this technology. In one example configuration, a module may be considered a service with one or more processes executing on a server or other computer hardware. Such services may be centrally hosted functionality or a service application that may receive requests and provide output to other services or customer devices. For example, modules providing services may be considered on-demand computing that is hosted in a server, cloud, grid or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide on-going access to the module or the third-party access may be based on a per transaction access where the third party pays for specific transactions that are provided and consumed.

It should be appreciated that although certain implementations disclosed herein are described in the context of computing instances or virtual machines, other types of computing configurations can be utilized with the concepts and technologies disclosed herein. For instance, the technologies disclosed herein can be utilized directly with physical hardware storage resources or virtual storage resources, hardware data communications (i.e., networking) resources, I/O hardware and with other types of computing resources.

Figure 3:
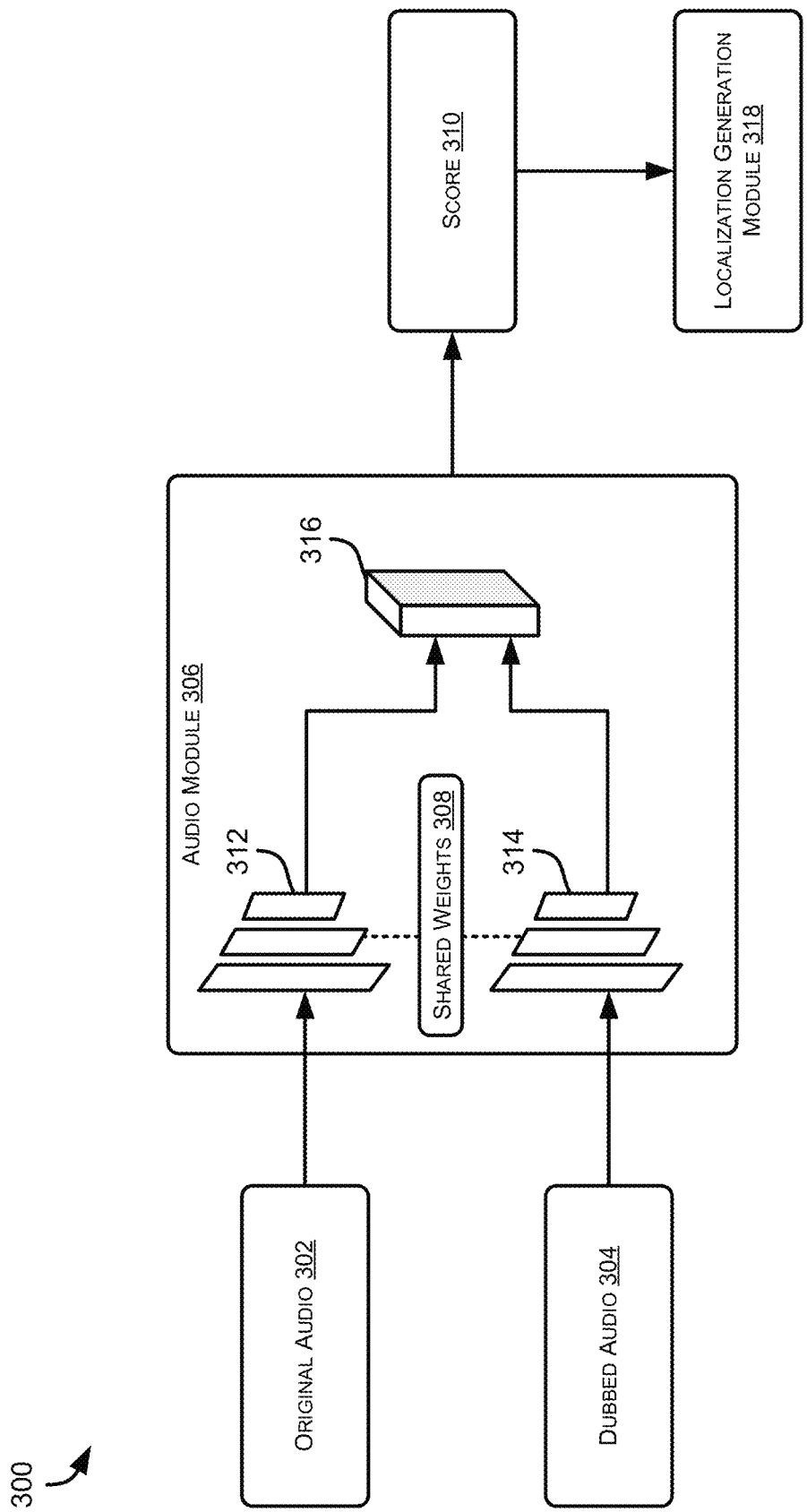
FIG. 3 illustrates an example twin neural network for audio dubbing evaluation, according to the present description.

FIG. 3 illustrates an example twin neural network 300 for audio dubbing evaluation, according to the present description. Although the twin neural network 300 is described herein, other machine learning models or artificial intelligence powered systems and methods may be used, particularly other architectures, to perform the operations described herein with respect to the twin neural network 300. The twin neural network 300 is an artificial neural network that uses the same weights (e.g., shared weights 308) while working in tandem on two different input vectors (e.g., original audio 302 and dubbed audio 304) to compute comparable output vectors. In some examples, one of the output vectors (e.g., for the original audio 302) is precomputed, thus forming a baseline against which the other output vector (e.g., the dubbed audio 304) is compared.

In an illustrative example, original audio 302, such as the audio track for the movie, is provided in English while the studio wishes to produce the dubbed audio 304 in a second language (e.g., French). The French dubbed audio 304 may be generated by performance artists reading a translated script or may be generated by an automated test-to-speech service. The movie studio may use the audio module 306 to determine the quality of the dubbed audio 304 and guide further refinement or improvement of the dubbed audio 304, produced by the localization generation module 318.

The twin neural network includes 2D convolution layers 312 and 314 followed by one densely connected layer 316. During training, the original audio 302 and dubbed audio 304 pairs are passed through the twin neural network to compute a distance function. The distance function or score 310 corresponds to a correlation between the original audio 302 and the dubbed audio 304, with respect to the characteristics observed and validated by the audio module 306. The audio module 306 of the twin neural network 300 is trained to validate performance characteristics or content-auxiliary characteristics rather than content. Though in some examples the audio module 306 may also be configured to validate content preserved during a localization process.

To train the audio module 306, the original audio 302 is processed through the 2D convolution layers 312 to obtain a first network embedding. Simultaneously, or sequentially, the dubbed audio 304 is processed through the 2D convolution layers 314 to obtain a second network embedding. The first network embedding and the second network embedding are separate mappings of discrete variables to a vector of continuous numbers, and due to the parallel nature of the twin neural network, the network embedding mappings can be compared to evaluate the similarity of the original audio 302 and dubbed audio 304, with respect to performance characteristics and/or content. The difference between the first network embedding and the second network embedding is then minimized to train the audio module 306. A distance or difference between the first network embedding and the second network embedding may be calculated using a Euclidean distance metric. The loss based on the Euclidean distance metric may then be minimized for training the audio module 306. In contrastive learning styles, such as described herein, positive and negative examples are provided to the audio module 306 for training. During training, when encountering the positive examples, the loss should be minimized. When encountering negative examples, the Euclidean distance and/or loss should be maximized. In particular, during training a particular pair of original audio 302 and dubbed audio 304 may be annotated as positive examples. As described above, the positive and negative examples may not be annotated or labeled, but may be identified as positive and negative examples based on their source. For example, professionally-curated localized content may be identified as positive examples due to the source being professionally-curated localized content. Negative examples may instead be an output of adjusting temporal or performance characteristics of the curated example, but do not require human labeling or annotation. With such positive examples, an expected distance between the network embeddings for each may be calculated, based on minimizing the loss. After the data is processed and the Euclidean distance is calculated, the actual distance may be compared to the expected distance. Differences between the expected and actual distance metrics may be used as feedback to adapt weights of the audio module 306 to achieve the target objective.

During inference, the distance between the generated dubbed content and the original content is computed, which indicates the quality of performance reenactment, especially with respect to the performance characteristics of the dubbed audio 304. That is, once the dubbed audio 304 is generated, the audio module 306 checks if the context-auxiliary characteristics are captured in the dubbed performance. In some examples, the original audio 302 and/or the dubbed audio 304 are segmented into discrete chunks for processing rather than as a whole. For example, one second long segments of the dubbed audio 304 may be evaluated against the original audio 302. In such examples, the outputs of the audio module 306 may be aggregated by averaging the scores for each of the chunks of the dubbed audio 304. A high score output by the audio module 306 indicates that the performance characteristics are preserved with high fidelity in the dubbed audio 304 while a low score indicates that the performance characteristics have not been preserved. In some examples, by using the granular data of the one segment chunks, the audio module 306 can provide feedback on which segments of the dubbed audio 304 to improve based on those segments receiving scores below a threshold. The threshold may be an absolute threshold or may be based on comparison with the scores of the other segments, for example to identify segments with scores below the average score of the entire dubbed audio 304 or other such evaluations.

In some examples, the audio module 306 may be used in real-time or near real-time during manual generation of localized content. The audio module 306 may output the scores for the dubbed audio 304 and the performer may improve the performance in real-time by adjusting performance characteristics, such as the emotion or tone of their performance to more closely match the original audio 302. In some examples, the audio module 306 and/or another module may output particular guidance, such as vectors, weightings, or classifications of the various performance characteristics to improve in the performance that may be based on the network embeddings. In this manner, the audio module 306 may be used to guide a performer to understand how close or far away from the original audio their performance is in terms of emotion, expressiveness and other performance characteristics. The audio module 306 and the score 310 generated by the audio module 306 may be used in generation of localized content by a localization generation module 318, that may include automatic and/or manual localization techniques and systems.

The audio module 306 may be used to guide improvement of particular performance characteristics, either in real-time use by a performer or by an auto-dubbing system, such as the localization generation module 318, with inputs and controls over various performance characteristic inputs. For example, when the score 310 is below a threshold then the audio module 306 may provide information on which performance characteristics are mis-aligned or incorrect. In some examples, the audio module may always output data reflective of the alignment with particular performance characteristics, that may be used for further refinement regardless of the score 310. The audio module 306 may be trained to output the performance characteristic misalignment by first generating speech performances for the same text data with different performance characteristics (e.g. with different emotion, sentiment etc.) using text to speech technology. The text to speech technology may allow variation of the output based on changing performance characteristics while maintaining the same content across samples. The generated audio samples having different performance characteristics are processed by the audio module 306 and the network embedding is determined for each. During inference, the audio module can recognize, based on comparison against the various network embeddings for the different performance characteristic-altered samples, which performance characteristics are not aligned if the audio module 306 reports that the original audio 302 and the dubbed audio 304 are not aligned. For the comparison, the audio module 306 may compare the distances of the network embedding of the original audio 302 and the dubbed audio 304 to distribution of the network embeddings of the samples generated as described above with varying performance characteristics. In an example, the audio module 306 may use an algorithm such as k-Nearest Neighbors (e.g., a non-parametric supervised learning method that receives k closest training examples and outputs a class membership or "neighborhood" for the object). By identifying the neighborhood, which defines the performance characteristics that are aligned and mis-aligned, a localization generator (automatic or human) may identify and alter specific performance characteristics to shift the neighborhood of the dubbed audio 304 to more closely align with the original audio 302 and thereby improve the dubbed audio produced by such systems.

Figure 4:
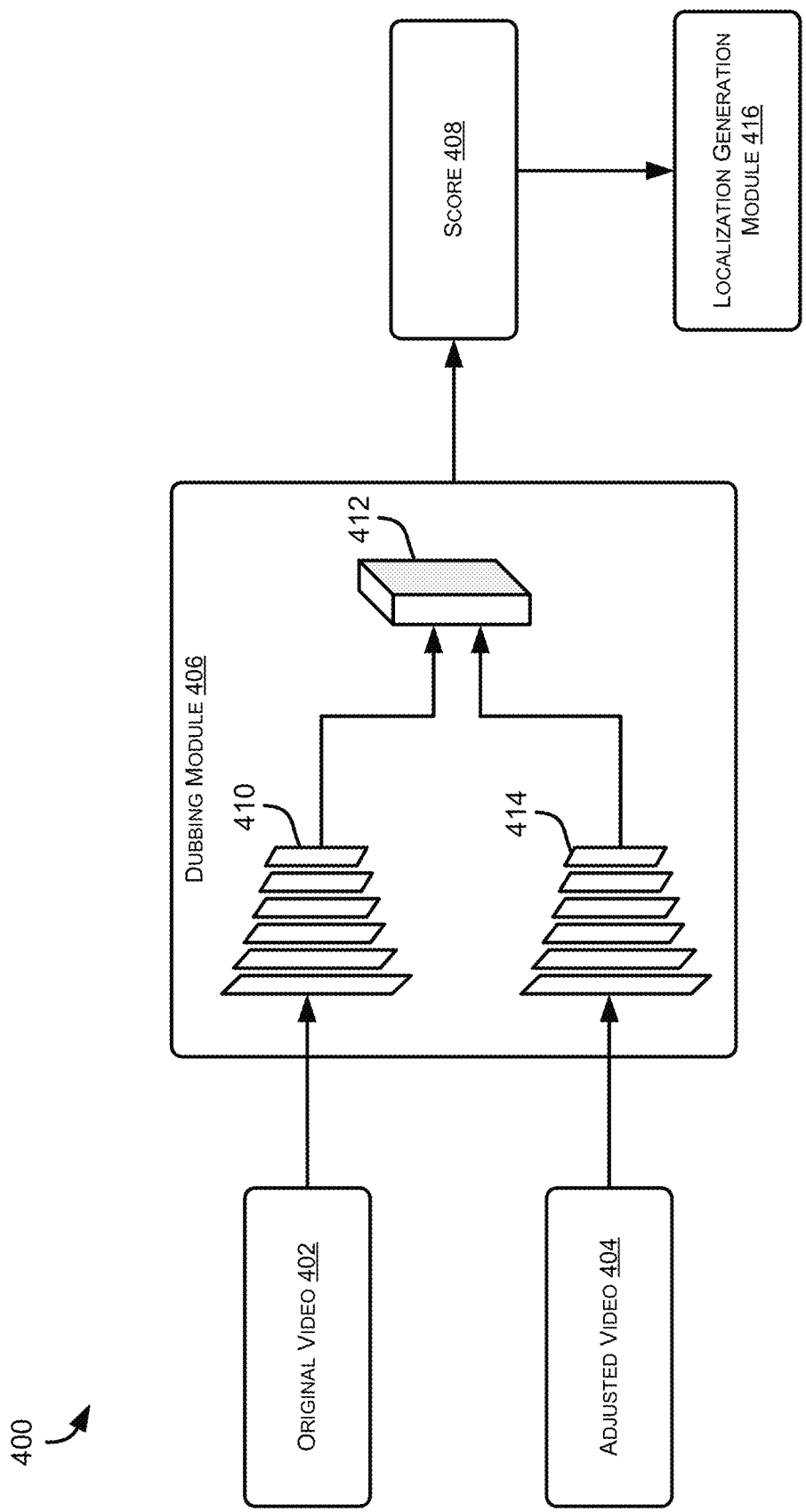
FIG. 4 illustrates an example twin neural network for video dubbing evaluation, according to the present description.

FIG. 4 illustrates an example twin neural network 400 for video dubbing evaluation, according to the present description. The twin neural network 400 may be similar to the twin neural network 300 of FIG. 3 but may be configured for validating synthetically generated video as part of a localization workflow. The twin neural network 400 includes a dubbing module 406 that includes convolution layers 410 and 414 as well as densely connected layer 412 similar to those described above, and outputs a score 408 reflective of the quality of the localized content with respect to preserving original creative intent through performance characteristics. As described above, the audio localization relies on parallel streams of audio data in different languages to generate positive and negative training examples. For video, positive and negative examples for us in contrastive learning are generated in a different manner as such parallel streams do not typically exist for video data.

In particular, original video 402 may be used to generate the positive and negative training samples. For example, a video-based emotion classifier, such as Amazon Rekognition, may be used to identify performance characteristics in video data from different languages (that may be different underlying video data) and pair together video data having performance characteristics that may be the same or nearly the same as one another. To determine that two video clips have similar performance characteristics, the video data may be processed using the emotion classifier and output a cloud or collection of performance characteristics and associated scores or weightings for each. The collections of performance characteristics and weightings or scores associated with each may be used to identify positive instances for training the dubbing module 406.

For negative samples to train the dubbing module, the emotion classifier and clouds of performance characteristics may again be used, but this time selecting video clips with different performance characteristic collections and scores as negative examples for training the dubbing module 406.

In another example, audio data associated with video data may be used to generate training data for the dubbing module 406. In particular, audio data associated with the video data may be passed through the twin neural network 300 of FIG. 3 to generate a cloud or collection of content-auxiliary characteristics. The twin neural network 300 may be used to identify a neighborhood or collection of various content-auxiliary characteristics, as well as values or intensities for each characteristic. Video data having a similar or identical set of characteristics may be identified as a positive pair for training the twin neural network. The video data may have a similar set of characteristics based on the identified characteristics being within a threshold score of the identified characteristics from the audio data. In this manner, the video data identified using the characteristic clouds may be paired with the original video data as a positive pair. In some examples, the twin neural network may identify video data in the same neighborhood, or having similar performance characteristics, for example using the k-NN algorithm. In such examples, the emotion classifier used on the video data and the neighborhood, indicating a collection of performance characteristics may be compared to identify positive and negative training examples. In instances where the performance characteristics identified by the twin neural network 300 and the emotion classifier are a close match, the pairs may be identified as positive instances, and those that differ by more than a threshold amount may be identified as negative instances.

In some examples, a similar process to that described above may be implemented to identify negative training pairs. For example, identifying characteristics from the audio data and identifying video data having characteristics that differ from the identified characteristics to generate negative pairs for training the twin neural network.

After the training data sets are identified as described herein, the dubbing module 406 may be trained to output validation, such as score 408, indicative of the fidelity with which the performance characteristics of the synthetically altered adjusted video 404 match those of the original video 402. The dubbing module includes 3D convolution layers 410 and 414 instead of the 2D convolution layers of audio module 306. After training, the dubbing module 406 be used in a similar manner to the audio module 306 described above, for guiding generation of localized content either manually generated or automatically generated. The score 408 may be used by a localization generation module 416 to generate localized video content, and the localization generation module 416 may include automatic and/or manual localization techniques and systems.

In an illustrative example, original video 402, such as movie itself, is provided associated with an audio track in English, meaning that the lips of the actors will move according to the English audio performance, which will not match the audio performance in a different language. Therefore, the localization generation module 416 may be used to alter the lip movements of the actors to match the localized audio. The augmented video data with the altered lip movement needs to match to original creative intent of the movie to provide a seamless viewing experience. The lip movement may be generated by one or more machine learning models or automated methods or may be manually altered, with the altered lip movements evaluated by the dubbing module 406 to ensure the lip movement is consistent with the original performance characteristics of the movie in English.

Figure 5:
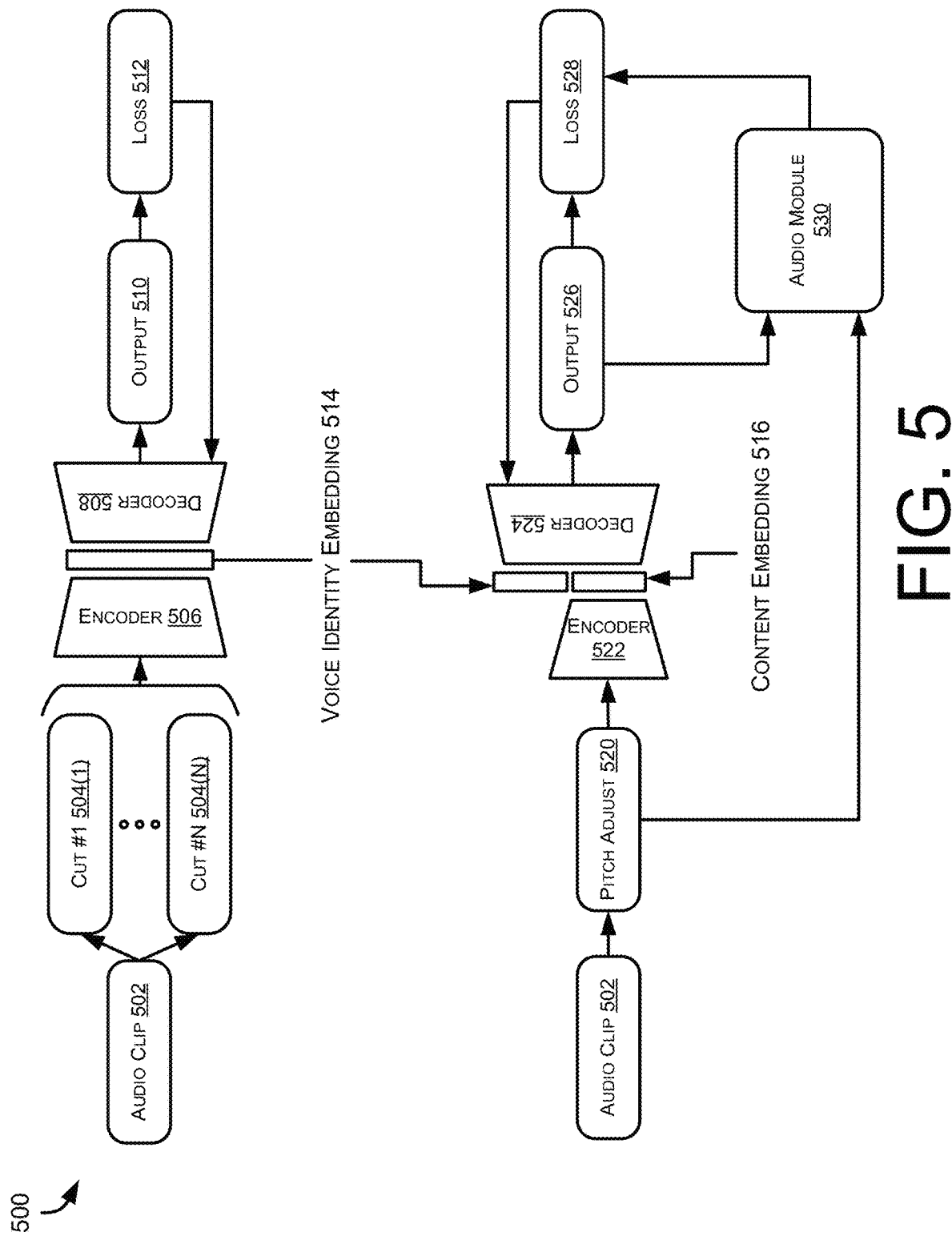
FIG. 5 illustrates an example illustration of a generative network for audio or video dubbing, according to the present description.

FIG. 5 illustrates an example illustration of a generative network 500 for audio or video dubbing, according to the present description. The generative network 500 may represent an auto-generative network or system for automatically producing localized content from original content. Though described herein with respect to a workflow for audio data, a similar workflow and structure may be used for generating localized video data.

The generative network 500 includes transfer of content and identity from the audio clip 502 to the final localized audio output. First, a voice identity for the audio clip 502 is identified that will be used for the localized content to provide a consistent consumer experience that matches the original voice of the performance artist but in a second language. The voice identity is independent of content translation, which may be performed by a separate workflow to ensure proper translation of the content of the audio clip 502. In some examples the content translation may be performed by a separate translation algorithm. Because the voice identity of the performed is independent of the content being delivered, the audio clip 502 is divided into a plurality of cuts 504(1)-504(N). The cuts 504(1)-504(N) may be of similar lengths to one another or may vary in length. In some examples, the cuts 504(1)-504(N) may be of around one second in length or may be longer or shorter in some examples.

The audio clip 502 may, in some examples, be processed into a mel spectrogram (e.g., a spectrogram where frequencies are converted into the mel scale). The audio clip 502 may be processed, cut into clips, and otherwise manipulated as described herein after converting to the mel spectrogram to enable computation with the audio data. In some examples, other data formats may be used for the audio and/or video data to enable the computations described herein.

After dividing the audio clip 502 into cuts 504(1)-504(N), the cuts 504(1)-504(N) are passed through an autoencoder. The autoencoder is a neural network that is used to learn efficient coding of unlabeled data for unsupervised learning. The encoding, by the encoder 506, is validated and refined by attempting to regenerate the input (cuts 504(1)-504(N)) from the decoder at the decoder 508. The output 510 of the decoder 508 may be compared against a random one of the cuts 504(1)-504(N) to compute a loss 512. From the loss 512, the autoencoder will be able to learn the voice identity of the one or more performers in the audio clip 502 while ignoring the content from the loss 512 because the contents of the clips will be misaligned due to the selection of a random cut for comparison with the output 510. The voice identity embedding 514 may then be extracted from the autoencoder for use in generating the localized audio clip.

After determining the voice identity embedding 514, the generative network 500 may use the voice identity embedding in producing localized audio. The audio clip 502 may be adjusted to randomly change the pitch, or other characteristics of the audio clip 502 at the pitch adjustment 520. The altered pitch adjustment of the audio clip 502 may be input into a second autoencoder that uses the voice identity embedding 514 to learn content embedding 516 independent of the voice identity embedding 514. The encoder 522 and decoder 524 encode and subsequently decode the audio clip 502, after pitch adjustment, using the two embeddings to produce output 526. The output 526 of the autoencoder may be refined using loss 528. The loss 528 attempts to minimize reconstruction loss at the second autoencoder but also maximizes a difference between the voice identity embedding and the content embedding.

The audio module 530, which may be the same as the audio module 306 of FIG. 3, is used as part of the loss 528 computation to penalize the output 526 if the performance characteristics of the audio clip 502 are not preserved in the output 526. The audio module 530 may also be used to improve the generative network 500 and thereby improve the outputs of the generative network 500. Using the audio module 530 as part of the loss 528 computation, the audio module 530 ensures that the generative network 500 preserves performance characteristics of the audio clip in the output 526.

Though described herein with respect to audio data, the generative network 500, or a similar generative network may be used for video generation of localized content. As described herein with respect to the audio module 306, the dubbing module 406 may instead be used in a generative network for video localization. In such examples, the dubbing module 406 may be used as a loss to motivate the generative network to preserve performance characteristics in synthetically altered video during a localization process.

Figure 6:
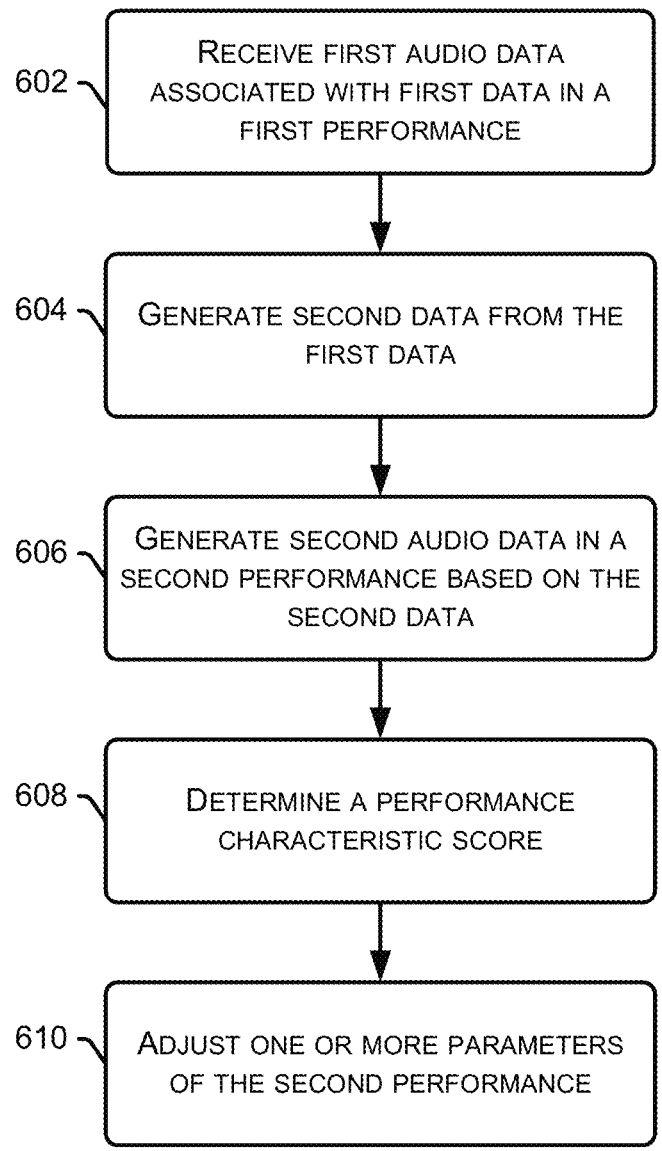
FIG. 6 illustrates an example process validating and adjusting dubbed performances, according to the present description.

FIG. 6 illustrates a flow diagram of a method according to the present technology. For simplicity of explanation, the method is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Any of a variety of other process implementations which would occur to one of ordinary skill in the art, including but not limited to variations or modifications to the process implementations described herein, are also considered to be within the scope of this disclosure.

FIG. 6 illustrates a process 600 for curating headshots of individuals to provide consistent and visually appealing headshots used in identification of individuals, according to the present description. The process 600 may be carried out by a computing system or device, such as the content server(s) 108 of FIG. 1, the computing device 210 of FIG. 2, and/or the computing device 700 of FIG. 7.

At 602, the process 600 includes receiving first audio data associated with first data in a first performance. The first data may include a text of the first audio data or may relate to other underlying data describing the first audio data. The first performance is in a first language that will be localized to produce audio data in a second language through the process 600. The first audio data may be received from a data store, as part of a catalog of items to be localized, to produce corresponding audio data in a second language. In some examples, the first audio data may be received during production of localized content, for example as part of an auto-dubbing or manual dubbing process.

In some examples, the first audio data may be associated with first video data as well. The first video data may include a video clip portraying an individual speaking the first audio data in the first language. The process 600 may be used to localize the audio data, validate localization of the audio data, localize the video data by generating synthetic video data (e.g., altering the video data to cause the mouth of a speaker to match localized audio data), and validating localized video data.

At 604, the process 600 includes generating second data, the second data including the content of the first data in a second language. The second data may be generated by translating the first data to preserve the content of the first data while in the second language. The process 600 is further used to preserve not only the content of the first audio data, but also the performance characteristics or content-auxiliary characteristics of the first audio data.

At 606, the process 600 includes generating second audio data in a second performance. The second audio data may be generated by an auto-dubbing process or by a manual performance of an individual based on the second data. In an auto-dubbing process, the second data may be performed using a test-to-speech program that receives the second data and outputs the second audio data based on parameters set on the text-to-speech program that may adjust the performance characteristics of the second audio data. In some examples, the second audio data may be received from a performer in near real-time during a manual dubbing process.

In a video localization process, the second audio data may be accompanied by second video data. The second video data may be synthetically altered such that the mouth and/or facial features of the individual speaking the audio data is altered to match the second audio data. The synthetic alteration of the video data may include replacement of the lips, mouth, facial features, or entire face of an individual within the video data. Such video alteration may be performed using a machine learning technique as part of a video dubbing process, such as auto-dubbing.

At 608, the process 600 includes determining a performance characteristic score. The performance characteristic score is determined using a trained machine learning model that is trained using audio data samples identified as positive and negative examples based on whether the samples preserve or fail to preserve the performance characteristics of the audio. The samples are provided in pairs and may be used in a contrastive learning method to train the machine learning model. The samples for positive pairs are pairs in which the performance characteristics have been preserved, while the negative examples have not preserved the performance characteristics in the subsequent data.

The positive instance for training the machine learning models may leverage existing localized content produced by professional studios and other such sources. Such professional content localization, while time-consuming, is often highly accurate to the original creative intent of the original content and is readily available for access in training the machine learning model. As such, the professional content localization may be used as positive instances for training the machine-learned model according to a contrastive learning technique.

To generate the negative instances for training the machine learning model, audio and/or video samples may be altered to intentionally mis-align the audio and/or video and identified as negative instances. The mis-aligned negative instances may be used to train the twin neural network to detect when the localization fails to preserve the creative intent as well as to identify when the content is out of alignment. Additional negative examples may be generated to ensure that the validation is focused on content-auxiliary characteristics and not just content translation. In such cases, negative examples may be generated by manually altering performance characteristics of a source audio file such that the content-auxiliary characteristics are not preserved. In such examples, the motion, sentiment, pitch, punctuation, and other such characteristics may be varied to generate negative examples for training the machine learning model. In some examples, a text-to-speech program may be used to create performances of transcribed audio from an original file where the text-to-speech program may be used to alter the content-auxiliary characteristics. The positive and negative instances may be used for contrastive training of the machine learning model to produce a dubbing score for content localized data from a source file.

For training data to implement the machine learning model with video data, training data may be generated by classifying emotion or sentiment in video data using a classifier, such as a machine learning model configured to identify sentiment or emotion. The video clips and associated sentiment data may be paired with other video clips having similar or identical sentiment classifiers for positive instances and may be paired with video clips having different characteristics for negative examples. In some examples, an audio data file associated with each video data file may be used to identify video clips having similar characteristics. Pairs of video clips associated with audio clips having the same or similar characteristics can be used as positive examples and pairs of video clips associated with audio clips having diverging or different characteristics can be used as negative training examples. Once the positive and negative training pairs are identified, the machine learning model can be trained with the video pairs in the same fashion as the machine learning model for audio localization validation described above.

At 610, the process 600 includes adjusting one or more parameters of the second performance. The performance may be adjusted using the machine learning model output in real-time or near real-time to identify performance characteristic misalignments as described herein. After identifying the misalignments, the second performance may be re-performed after adjusting the performance characteristics to further improve the output of the localization process.

The machine learning model may also be used for generating localized content from original data. In such examples, video data and/or audio data may be input into a localized content generation network that may use the machine learning model to evaluate the localized content as-generated, and can be used for feedback and further development of the localized content to produce higher quality localized content using an auto-dubbing technique and/or system.

Figure 7:
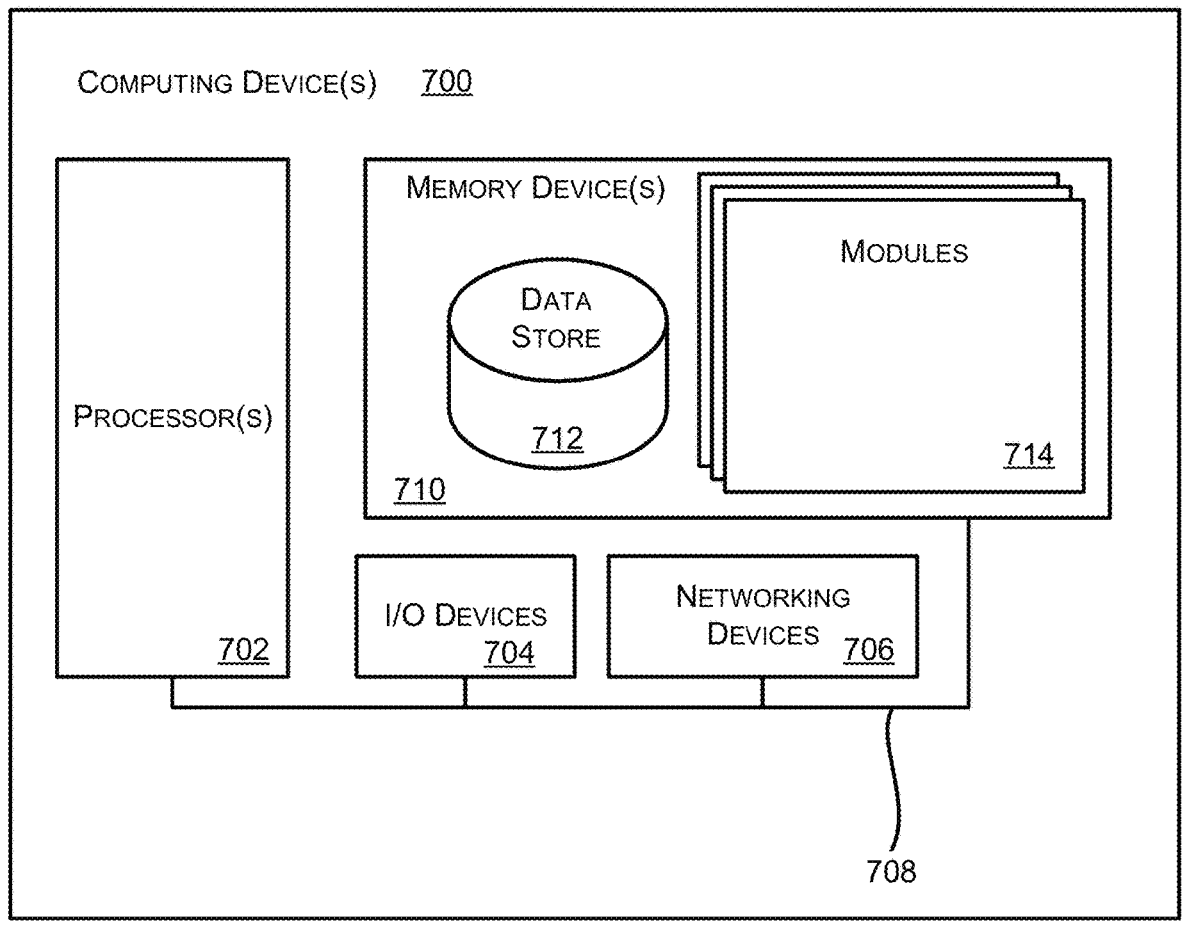
FIG. 7 illustrates a block diagram of a computing system for use with the systems and methods described herein, according to the present description.

FIG. 7 illustrates a block diagram of a computing device 700 for use in generating and curating headshots, according to the present description. The computing device 700 may include one or more computing devices on which services or modules of this technology may execute. The computing device 700 is illustrated on which a high-level example of the technology may be executed. The computing device 700 may be an example of the content server 108 of FIG. 1. The computing device 700 may include one or more processors 702 that are in communication with memory devices 710. The computing device 700 may include a local communication interface 708 for the components in the computing device. For example, the local communication interface 708 may be a local data bus and/or any related address or control busses as may be desired.

The memory device 710 may contain modules 714 that are executable by the processor(s) and data for the modules 714. The module 6514 may include the modules shown and described with respect to FIG. 3, among others. A data store 712 may also be located in the memory device 710 for storing data related to the modules and other applications along with an operating system that is executable by the processor 702.

The computing device 700 may further include or be in communication with a client device, which may include a display device. The client device may be available for an administrator to use in interfacing with the computing device 700, such as to review operation of a virtual computing instance, make improvements to machine learning models and so forth.

Various applications may be stored in the memory device 710 and may be executable by the processor 702. Components or modules discussed in this description that may be implemented in the form of software using high programming level languages that are compiled, interpreted or executed using a hybrid of the methods.

The computing device 700 may also have access to I/O (input/output) devices 704 that are usable by the computing devices. An example of an I/O device 704 is a display screen that is available to display output from the computing devices. Other known I/O device may be used with the computing device as desired. Networking devices 706 and similar communication devices may be included in the computing device 700. The networking devices 706 may be wired or wireless networking devices 706 that connect to the internet, a LAN, WAN, or other computing network.

The components or modules that are shown as being stored in the memory device 710 may be executed by the processor 702. The term "executable" may mean a program file that is in a form that may be executed by a processor 702. For example, a program in a higher level language may be compiled into machine code in a format that may be loaded into a random access portion of the memory device 710 and executed by the processor 702, or source code may be loaded by another executable program and interpreted to generate instructions in a random access portion of the memory to be executed by a processor 702. The executable program may be stored in any portion or component of the memory device 710. For example, the memory device 710 may be random access memory (RAM), read only memory (ROM), flash memory, a solid-state drive, memory card, a hard drive, optical disk, floppy disk, magnetic tape, or any other memory components.

The processor 702 may represent multiple processors and the memory device 710 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. The computer readable storage medium may, for example, be in the form of a non-transitory computer readable storage medium. As used herein, the terms "medium" and "media" may be interchangeable with no intended distinction of singular or plural application unless otherwise explicitly stated. Thus, the terms "medium" and "media" may each connote singular and plural application.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

It is noted that any of the distributed system implementations described above, or any of their components, may be implemented as one or more web services. In some implementations, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke and may define a particular application programming interface (API) to which other systems may be expected to conform when requesting the various operations.

In various implementations, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some implementations, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features, it is to be understood that the subject matter defined in the appended claims is not necessarily limited to the specific features described. Rather, the specific features are disclosed as illustrative forms of implementing the claims.

The invention claimed is:

1. A method for generating training data for training a machine learning model to perform localization of audiovisual content, the method comprising:
receiving first content in a first language, the first content comprising audio and video data;
generating second language data by translating, using one or more processors, at least a portion of the first content to a second language;
generating, using a machine learning model, second content associated with a second presentation of the second language data;
evaluating the second content for one or more performance characteristics to generate a first performance score;
generating third content by adjusting a parameter of the second presentation of the second language data in response to evaluating the second content;
evaluating the third content for the one or more performance characteristics to generate a second performance score;
annotating the second content using the first performance score; and
annotating the third content using the second performance score.

2. The method of claim 1, further comprising:
storing a training dataset comprising the second content annotated with the first performance score and the third content annotated with the second performance score; and
training the machine learning model for content localization using the training dataset.

3. The method of claim 1, further comprising:
receiving fourth content associated with the first content, the fourth content comprising professionally curated localized content;
annotating the fourth content with a score indicative of the professionally curated localized content;
generating fifth content by adjusting a second parameter of the fourth content; and
annotating the fifth content with a score indicative of a misalignment of the second parameter with the fourth content.

4. The method of claim 1, wherein:
generating the third content comprises misaligning the one or more performance characteristics;
annotating the second content comprises labeling the second content as positive; and
annotating the third content comprises labeling the third content as negative, and wherein the method further comprises:
generating a training set by storing the second content and the third content with the first performance score and the second performance score.

5. A method comprising:
determining first content associated with a first language;
generating second language data by translating, using one or more processors, at least a portion of the first content to a second language;
generating, using a machine learning model, second content associated with a second presentation of the second language data;
evaluating the second content for one or more performance characteristics; and
generating third content by adjusting a parameter of the second presentation of the second language data in response to evaluating the second content.

6. The method of claim 5, further comprising:
storing a training dataset comprising the second content annotated with a result of evaluating the second content for the one or more performance characteristics and the third content annotated with an associated score associated with adjusting the parameter; and
training the machine learning model for content localization using the training dataset.

7. The method of claim 5, wherein evaluating the second content comprises receiving a first annotation indicative of the one or more performance characteristics, the method further comprising:
determining a second annotation associated with the third content; and
training the machine learning model for content localization based at least in part on the second content, the third content, the first annotation, and the second annotation.

8. The method of claim 5, wherein evaluating the second content comprises:
dividing the second content into a plurality of segments;
determining characteristic scores for the plurality of segments; and
determining a score based at least in part on the characteristic scores for the plurality of segments.

9. The method of claim 5, wherein the first content comprises first audio data and first video data and wherein generating the third content comprises:
altering the first video data by dubbing movements of lips of individuals portrayed in the first video data using the machine learning model, the machine learning model comprising a three-dimension convolution twin neural network, to produce second video data associated with the third content.

10. The method of claim 9, wherein the machine learning model comprises a video-based emotion classifier to identify emotion characteristics in video data, and wherein the machine learning model is trained using contrastive learning based at least in part on a positive training set and a negative training set.

11. The method of claim 10, wherein the video-based emotion classifier is used to evaluate the second content.

12. The method of claim 11, further comprising:
determining, using the video-based emotion classifier, a first collection of characteristics for a first video clip of the second content;
determining, using the video-based emotion classifier, a second collection of characteristics for a second video clip of the third content;
determining the positive training set in response to the first collection of characteristics being within a first threshold of the second collection of characteristics; and
determining the negative training set in response to the first collection of characteristics differing from the second collection of characteristics by more than a second threshold.

13. The method of claim 5, further comprising:
receiving fourth content associated with the first content, the fourth content comprising professionally curated localized content;
annotating the fourth content with a score indicative of the professionally curated localized content;
generating fifth content by adjusting a second parameter of the fourth content; and
annotating the fifth content with a score indicative of a misalignment of the second parameter with the fourth content.

14. The method of claim 5, wherein:
generating the third content comprises misaligning the one or more performance characteristics;
annotating the second content comprises labeling the second content as positive; and
annotating the third content comprises labeling the third content as negative, and wherein the method further comprises:
generating a training set by storing the second content and the third content.

15. A non-transitory computer-readable medium having instructions stored thereon that, when executed by one or more processors, cause the one or more processors to perform operations comprising:

determining first content associated with a first language;
generating second language data by translating, using one or more processors, at least a portion of the first content to a second language;
generating, using a machine learning model, second content associated with a second presentation of the second language data;
evaluating the second content for one or more performance characteristics;
generating third content by adjusting a parameter of the second presentation of the second language data in response to evaluating the second content;
storing a training dataset comprising the second content annotated with a result of evaluating the second content for the one or more performance characteristics and the third content annotated with an associated score associated with adjusting the parameter; and
training the machine learning model for content localization using the training dataset.

16. The non-transitory computer-readable medium of claim 15, wherein evaluating the second content comprises receiving a first annotation indicative of the one or more performance characteristics, the operations further comprising:
determining a second annotation associated with the third content; and
training the machine learning model for content localization based at least in part on the second content, the third content, the first annotation, and the second annotation.

17. The non-transitory computer-readable medium of claim 15, wherein evaluating the second content comprises:
dividing the second content into a plurality of segments;
determining characteristic scores for the plurality of segments; and
determining a score based at least in part on the characteristic scores for the plurality of segments.

18. The non-transitory computer-readable medium of claim 15, wherein the first content comprises first audio data and first video data and wherein generating the third content comprises:
altering the first video data by dubbing movements of lips of individuals portrayed in the first video data using the machine learning model, the machine learning model comprising a three-dimension convolution twin neural network, to produce second video data.

19. The non-transitory computer-readable medium of claim 18, wherein the machine learning model comprises a video-based emotion classifier to identify emotion characteristics in video data, and wherein the machine learning model is trained using contrastive learning based at least in part on a positive training set and a negative training set.

20. The non-transitory computer-readable medium of claim 15, wherein:
generating the third content comprises misaligning the one or more performance characteristics;
annotating the second content comprises labeling the second content as positive; and
annotating the third content comprises labeling the third content as negative, and wherein the operations further comprise:
generating a training set by storing the second content and the third content.

* * * * *